US011983740B2

(12) United States Patent
Allexi et al.

(10) Patent No.: US 11,983,740 B2
(45) Date of Patent: May 14, 2024

(54) MOTOR VEHICLE AND METHOD FOR DISPLAYING A PARKING DURATION AND/OR A PARKING START OF A MOTOR VEHICLE

(71) Applicant: Ford Global Technologies, LLC, Dearborn, MI (US)

(72) Inventors: Gregor Allexi, Sinzig (DE); Mithat Ceylan, Langenfeld (DE)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 17/373,340

(22) Filed: Jul. 12, 2021

(65) Prior Publication Data

US 2022/0012775 A1    Jan. 13, 2022

(30) Foreign Application Priority Data

Jul. 13, 2020   (DE) .......................... 102020208716.4

(51) Int. Cl.
| | |
|---|---|
| *G06Q 30/00* | (2023.01) |
| *G06Q 30/0251* | (2023.01) |
| *G06Q 30/0283* | (2023.01) |
| *G07B 15/02* | (2011.01) |
| *G07B 15/06* | (2011.01) |
| *G09F 21/04* | (2006.01) |

(52) U.S. Cl.
CPC ..... *G06Q 30/0266* (2013.01); *G06Q 30/0284* (2013.01); *G07B 15/02* (2013.01); *G07B 15/063* (2013.01); *G09F 21/048* (2013.01)

(58) Field of Classification Search
None
See application file for complete search history.

(56) References Cited

U.S. PATENT DOCUMENTS

| 6,195,015 B1* | 2/2001 | Jacobs ................. G07F 17/246 |
| | | 340/693.9 |
| 9,584,776 B2* | 2/2017 | Stefan ..................... G07B 15/02 |
| 9,915,089 B2* | 3/2018 | Farooq ..................... E05F 15/71 |
| 10,032,368 B1* | 7/2018 | Thompson ......... G06Q 30/0284 |
| 2008/0052254 A1* | 2/2008 | Al Amri ............. G06Q 30/0284 |
| | | 705/418 |
| 2012/0264361 A1* | 10/2012 | Scheer ................. B60H 3/0035 |
| | | 454/75 |
| 2014/0069015 A1* | 3/2014 | Salter ..................... E05B 81/00 |
| | | 49/31 |
| 2014/0339300 A1* | 11/2014 | Chen ....................... G07C 1/30 |
| | | 235/377 |

(Continued)

FOREIGN PATENT DOCUMENTS

| DE | 202015003921 U1 | 7/2015 | |
| DE | 202015003921 U1 * | 9/2015 | ............. G03B 21/10 |

(Continued)

*Primary Examiner* — Luis A Brown
(74) *Attorney, Agent, or Firm* — Brandon Hicks; Eversheds Sutherland (US) LLP

(57) ABSTRACT

The invention relates to a motor vehicle (1). In order to increase motor vehicle user convenience and eco-friendliness in connection with a parking of motor vehicles (1) subject to a charge, the motor vehicle (1) has at least one device (2) permanently integrated into at least one structure of the motor vehicle (1) for displaying a parking duration and/or a parking start of the motor vehicle.

5 Claims, 2 Drawing Sheets

(56) References Cited

U.S. PATENT DOCUMENTS

| | | | | |
|---|---|---|---|---|
| 2016/0111003 A1* | 4/2016 | Miura | ............... | G08G 1/146 |
| | | | | 340/932.2 |
| 2016/0247210 A1* | 8/2016 | Yamashiro | ............ | G07B 15/02 |
| 2017/0057519 A1* | 3/2017 | Ungetheim | ............ | A61G 3/061 |
| 2017/0249625 A1* | 8/2017 | Vossoughi | ......... | G06Q 30/0266 |
| 2017/0329346 A1* | 11/2017 | Latotzki | ............... | G05D 1/0291 |
| 2018/0088887 A1* | 3/2018 | LeBlanc | ............... | G06F 3/1431 |
| 2018/0188531 A1* | 7/2018 | Dubey | ............... | B60K 35/00 |
| 2018/0315313 A1* | 11/2018 | Klochikhin | ............ | G08G 1/146 |
| 2020/0250978 A1* | 8/2020 | Klochikhin | ............ | H04W 4/40 |
| 2021/0024069 A1* | 1/2021 | Herman | ......... | B60W 60/00274 |
| 2021/0224769 A1* | 7/2021 | Sun | .................. | G08G 1/147 |
| 2021/0366283 A1* | 11/2021 | Klochikhin | ............ | G08G 1/205 |
| 2022/0066723 A1* | 3/2022 | Lottes | ............... | B60R 25/241 |

FOREIGN PATENT DOCUMENTS

| | | | |
|---|---|---|---|
| DE | 102018201766 A1 | 8/2019 | |
| WO | 2020126328 A1 | 6/2020 | |
| WO | WO-2020126328 A1 * | 6/2020 | ............ B60K 35/00 |

\* cited by examiner

MOTOR VEHICLE AND METHOD FOR DISPLAYING A PARKING DURATION AND/OR A PARKING START OF A MOTOR VEHICLE

CROSS-REFERENCE TO RELATED APPLICATIONS

This application claims priority to and the benefit of German Patent Application No. 102020208716.4, filed Jul. 13, 2020, which is hereby incorporated by reference herein in its entirety.

FIELD

The invention relates to a motor vehicle and a method for displaying a parking duration and/or a parking start of a motor vehicle.

BACKGROUND

The parking of a motor vehicle in an urban area normally requires the purchase of a parking tickets at a parking ticket machine or the visible arrangement of a parking disc on a dashboard. Both are perceived by motor vehicle users as inconvenient. In order to purchase a parking ticket, the user must actually leave the motor vehicle, walk to the parking ticket machine, usually purchase a parking ticket at the parking ticket machine with small change, return to the motor vehicle with the parking ticket and arrange the parking ticket visibly in the motor vehicle, usually on the dashboard. A parking disc must be carried along in the motor vehicle and must be stored accessibly in the motor vehicle in order to be settable precisely to the respective parking start and to be visibly arrangeable on the dashboard.

US 2017/249 625 A1 discloses a dynamic parking management platform having a mobile communication device, a parking server and an electronic ticket device which interwork in order to enable a vehicle user to perform a secure parking charge payment transaction electronically.

US 2014/339 300 A1 discloses a ticket token and a ticket card which in each case have a display module. The display module is mounted on a token body or a card body. The display module has a display to display a parking time.

SUMMARY

The object of the invention is to increase motor vehicle user convenience and eco-friendliness in connection with a parking of motor vehicles subject to a charge.

The object is achieved according to the invention by a motor vehicle with the features of claim 1 which has at least one device permanently integrated into at least one structure of the motor vehicle for displaying a parking duration and/or a parking start of the motor vehicle.

It should be noted that the features and measures described individually in the following description can be combined with one another in any technically appropriate manner and represent further designs of the invention. The description characterizes and specifies the invention, in particular additionally in connection with the figures.

According to the invention, the parking duration, i.e. the current duration of the given parking state, and/or the parking start, i.e. the time of the start of the given parking state, of the motor vehicle is/are displayed by means of a device permanently integrated into at least one structure of the motor vehicle. A motor vehicle user does not therefore have to obtain and handle a parking ticket in the laborious manner described above or laboriously handle a parking disc. Motor vehicle user convenience is consequently increased with the invention in connection with a parking of motor vehicles subject to a charge. Since the invention further renders parking ticket machines, parking tickets and parking discs, particularly made of plastic, superfluous, the invention inevitably increases eco-friendliness in connection with the parking of motor vehicles subject to a charge.

The motor vehicle can, for example, be a passenger vehicle or a commercial vehicle. The device can be configured, in particular, for the alphanumeric display of information.

According to one advantageous design, the device is at least partially formed by at least one electrical display device of the motor vehicle which is arranged in the interior the motor vehicle. The electrical display device is preferably designed as energy-saving in order to avoid overloading a battery of the motor vehicle. The electrical display device can have at least one electrical display unit arranged on an upper side of the dashboard. The electrical display unit can be designed, for example, as a backlit or non-backlit LCD display.

A further advantageous design provides that the electrical display device is a head-up display. The head-up display is configured to project the parking duration and/or the parking start on a front windshield of the motor vehicle in such a way that the parking duration and/or the parking start is/are readable from outside the motor vehicle. An existing head-up display of the motor vehicle, for example, can be modified for this purpose. The head-up display can use, for example, a back projection technology here. The head-up display can be configured to switch between a conventional internal mode in which information which is visible only in the interior of a passenger compartment of the motor vehicle is displayed on the windshield to a driver of the motor vehicle during a journey, and an external mode in which the parking duration and/or the parking start is/are projected onto the windshield, visible from outside the vehicle, and vice versa, whereby, for example, a projection direction and/or an intensity of a projection light is/are varied, wherein the intensity of the projection light must be high enough in the external mode so that the parking duration and/or the parking start is/are visible from outside the motor vehicle. The head-up display can be configured to project a virtual parking disc onto the windshield.

According to a further advantageous design, the device is at least partially formed by at least one electrical lighting unit of the motor vehicle, which is arranged externally on the motor vehicle and is configured for the alphanumeric display of the parking duration and/or the parking start. The electrical lighting unit can, for example, be a part of a front light or a rear light of the motor vehicle. By means of a new electrical control of an existing lighting unit, the latter can have the new display function.

According to a further advantageous design, the electrical lighting unit has organic light-emitting diodes. As a result, relatively small numbers and letters can also be displayed exactly with the electrical lighting unit.

A further advantageous design provides that the motor vehicle has at least one electronic evaluation system which is configured to receive position data relating to the current position of the motor vehicle, to determine, taking account of the position data, whether the parked motor vehicle is parked in an area in which the display of the parking duration and/or the parking start is/are required, and to display the parking duration and/or the parking start automatically or at the instigation of a user via a man-machine interface of the motor vehicle if the parked motor vehicle is parked in an area in which the display of the parking duration and/or the parking start is/are required. The electronic evaluation system can be implemented as a separate unit or by means of a new software implementation into a conventionally available electronic evaluation system. The electronic control system receives the position data from a satellite system, for example a GPS system. Local parameters which are compared with the received position data can be stored in an electrical storage unit of the electronic evaluation system in order to determine whether the parked motor vehicle is parked in an area in which the display of the parking duration and/or the parking start is/are required. Here, the electronic evaluation system can be configured to detect, from driving state parameters of the motor vehicle measured by sensors, that a parking state of the motor vehicle has been initiated. The man-machine interface can be provided, for example, by means of an instrument panel or at least one actuation element arranged thereon or at least one touchscreen arranged thereon. Alternatively, the man-machine interface can enable a voice control so that a motor vehicle user can specify via voice commands whether or not the parking duration and/or the parking start is/are displayed.

According to a further advantageous design, the electronic evaluation system is configured to determine a cost-free parking time and/or a maximum permitted parking duration if the parked motor vehicle is parked in an area in which the display of the parking duration and/or the parking start is/are required, and to indicate the cost-free parking time and/or the maximum permitted parking duration in a passenger compartment of the motor vehicle. This information can be indicated and therefore communicated to the motor vehicle user, for example, via a display inside the passenger compartment and/or audibly, for example as voice output.

According to a further advantageous design, the electronic evaluation system is configured for wireless communication with an automatic parking charge billing system, wherein the electronic evaluation system is configured to initiate parking charge billing automatically or at the instigation of a user via a man-machine interface of the motor vehicle. The man-machine interface can be provided, for example, by means of an instrument panel or at least one actuation element arranged thereon or at least one touchscreen arranged thereon. Alternatively, the man-machine interface can enable a voice control so that a motor vehicle user can specify via voice commands whether the parking procedure is or is not intended to be billed via the automatic parking charge billing system.

The above object is further achieved by a method with the features of Claim 9, according to which the parking duration and/or the parking start is/are displayed by means at least one device permanently integrated into at least one structure of the motor vehicle.

The advantages specified above with reference to the motor vehicle are associated accordingly with the method. In particular, the motor vehicle according to one of the aforementioned designs or a combination of at least two of these designs with one another can be used to carry out the method. Advantageous designs of the motor vehicle can correspond to advantageous designs of the method, and vice versa, even if no explicit reference thereto is made below.

According to one advantageous design, the parking duration and/or the parking start is/are displayed by means of at least one electrical display device of the motor vehicle which is arranged in the interior of the motor vehicle. The advantages specified above with reference to the corresponding design of a motor vehicle are associated accordingly with this design.

A further advantageous design provides that the parking duration and/or the parking start is/are displayed by means of a head-up display of the motor vehicle. The advantages specified above with reference to the corresponding design of the motor vehicle are associated accordingly with this design. The head-up display can use, for example, a back projection technology here.

According to a further advantageous design, the parking duration and/or the parking start is/are displayed by means of at least one electronic lighting unit of the motor vehicle which is arranged on the outside of the motor vehicle and is configured for the alphanumeric display of the parking duration and/or the parking start. The advantages specified above with reference to the corresponding design of a motor vehicle are associated accordingly with this design.

According to a further advantageous design, position data relating to the current position of the motor vehicle are received, it is determined, taking account of the position data, whether the parked motor vehicle is parked in an area in which the display of the parking duration and/or the parking start is/are required, and the parking duration and/or the parking start is/are displayed automatically or at the instigation of a user via a man-machine interface of the motor vehicle if the parked motor vehicle is parked in an area in which the display of the parking duration and/or the parking start is/are required. The advantages specified above with reference to the corresponding design of the motor vehicle are associated accordingly with this design.

A further advantageous design provides that position data relating to the current position of the motor vehicle are received, a cost-free parking time and/or a maximum permitted parking duration is/are determined, taking account of the position data, if the parked motor vehicle is parked in an area in which the display of the parking duration and/or the parking start is/are required, and the cost-free parking time and/or the maximum permitted parking duration is/are indicated in a passenger compartment of the motor vehicle. The advantages specified above with reference to the corresponding design of the motor vehicle are associated accordingly with this design.

According to a further advantageous design, parking charge billing is initiated via an automatic parking charge billing system automatically or at the instigation of a user via a man-machine interface of the motor vehicle, wherein the resulting parking duration is displayed in a controllable manner via the device for displaying a parking duration and/or a parking start of the motor vehicle. The advantages specified above with reference to the corresponding design of a motor vehicle are associated accordingly with this design.

BRIEF DESCRIPTION OF THE DRAWINGS

Further advantageous designs of the invention are disclosed in the subclaims and in the following description of the figure, wherein:

DETAILED DESCRIPTION

Figure 1:
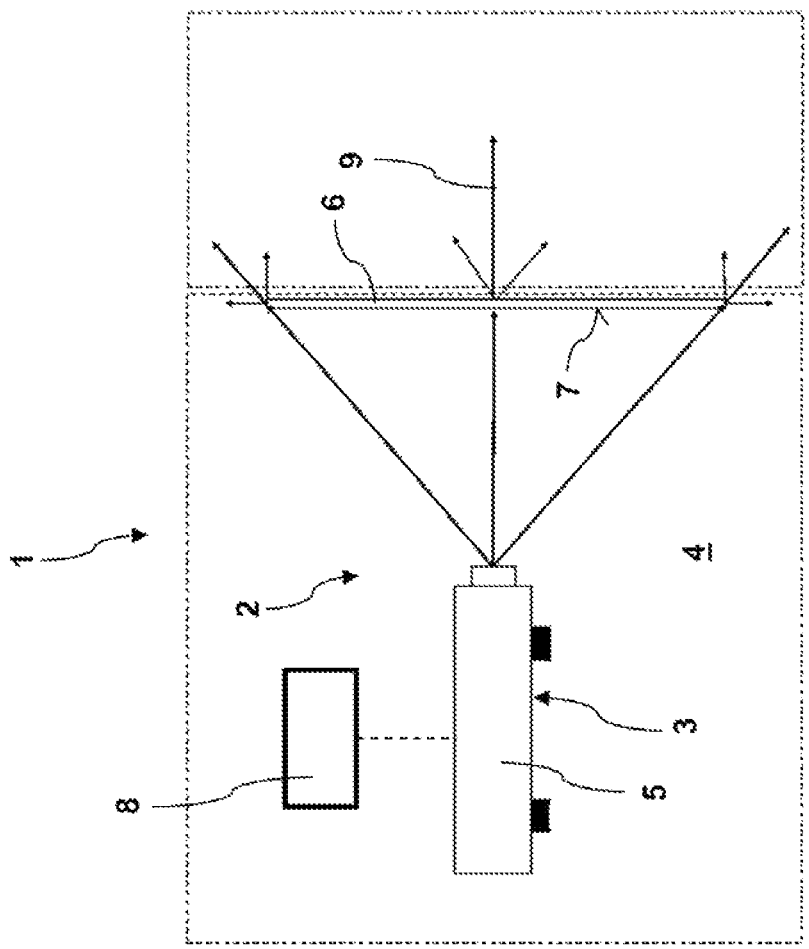
FIG. 1 shows a schematic view of an example embodiment of a motor vehicle according to the invention.

FIG. 1 shows a schematic view of an example embodiment of a motor vehicle 1 according to the invention having a device 2 permanently integrated into at least one structure (not shown) of the motor vehicle 1 for displaying a parking duration and/or a parking start of the motor vehicle 1.

The device 2 is formed by an electrical display device 3 of the motor vehicle 1 which is arranged in the interior 4 of the motor vehicle 1. The electrical display device 3 is a head-up display having an imaging unit 5 arranged on a dashboard (not shown) of the motor vehicle 1 and a projection surface 7 arranged on a windshield 6 of the motor vehicle. The head-up display can use, for example, a back projection technology here.

Alternatively, the device 2 can be formed at least partially by at least one electrical lighting unit (not shown) of the motor vehicle 1 which is arranged on the outside of the motor vehicle 1 and is configured for the alphanumeric display of the parking duration and/or the parking start. The electrical lighting unit can have organic light-emitting diodes.

The motor vehicle 1 further has an electronic evaluation system 8 which is configured to receive position data relating to the current position of the motor vehicle 1, to determine, taking account of the position data, whether the parked motor vehicle 1 is parked in an area in which the display of the parking duration and/or the parking start is/are required, and to display the parking duration and/or the parking start automatically or at the instigation of a user via a man-machine interface of the motor vehicle 1 if the parked motor vehicle 1 is parked in an area in which the display of the parking duration and/or the parking start is/are required.

The electronic evaluation system 8 is configured to determine a cost-free parking time and/or a maximum permitted parking duration if the parked motor vehicle 1 is parked in an area in which the display of the parking duration and/or the parking start is/are required, and to indicate the cost-free parking time and/or the maximum permitted parking duration in a passenger compartment or the interior 4 of the motor vehicle 1.

The electronic evaluation system 8 is further configured for wireless communication with an automatic parking charge billing system (not shown). The electronic evaluation system 8 is configured to initiate parking charge billing automatically or at the instigation of a user via a man-machine interface (not shown) of the motor vehicle 1.

As can be seen in FIG. 1, the light beams indicated by arrows 9 pass through the windshield 6 so that the light emitted by the imaging unit 5 is detectable from outside the motor vehicle 1 in order to display the parking duration or parking start.

Figure 2:
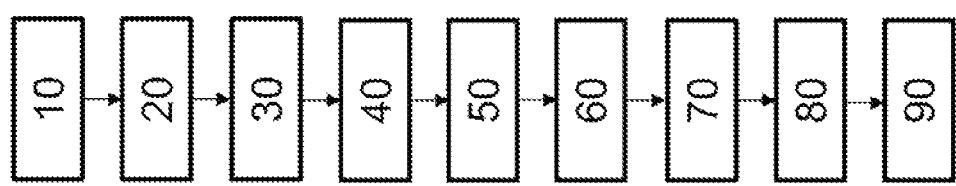
FIG. 2 shows a flow diagram of an example embodiment of a method according to the invention.

FIG. 2 shows a flow diagram of an example embodiment of a method according to the invention for displaying a parking duration and/or a parking start of a motor vehicle.

In method step 10, the motor vehicle is driven into an area in which the display of the parking duration and/or the parking start is/are required. In method step 20, the drive of the motor vehicle is switched off. In method step 30, a motor vehicle user activates a display function via a man-machine interface to display a parking duration and/or a parking start of the motor vehicle. In method step 30, the motor vehicle user can be asked in advance whether he wishes or does not wish to activate the display function for this purpose.

In method step 40, a drive control unit of the motor vehicle transmits a "drive off" signal to a device permanently integrated into at least one structure of the motor vehicle for displaying a parking duration and/or a parking start. In method step 50, the motor vehicle user opens a vehicle door, gets out of the motor vehicle and closes the motor vehicle door once more. In method step 60, a door sensor of the motor vehicle transmits a "door closed" signal to the device. In method step 70, the motor vehicle user locks the motor vehicle doors. In method step 80, the door sensor transmits a "door locked" signal to the device. It is determined from these signals that the motor vehicle is in a parking state.

In method step 90, position data relating to the current position of the motor vehicle are received automatically. Taking account of the received position data, it is determined electronically whether the parked motor vehicle is parked in an area in which the display of the parking duration and/or the parking start is/are required. The parking duration and/or the parking start is/are therefore displayed by means of the device. The device can be designed at least partially as a head-up display. Alternatively, the device can be formed at least partially as an electrical lighting unit of the motor vehicle which is arranged on the outside of the motor vehicle and is configured for the alphanumeric display of the parking duration and/or the parking start.

In method step 90, parking charge billing is further initiated automatically via an automatic parking charge billing system, wherein the parking duration resulting therefrom is displayed in a controllable manner via the device 2 for displaying a parking duration and/or a parking start of the motor vehicle 1.

REFERENCE NUMBER LIST

1 Motor vehicle
2 Device
3 Display device
4 Interior of 1 (passenger compartment)
5 Imaging unit of 3
6 Windshield
7 Projection surface
8 Electronic evaluation system
9 Arrow (light beam)
10-90 Method step

The invention claimed is:
1. A motor vehicle (1), comprising:
a front light or a rear light;
a projection surface arranged on the front light or the rear light;
at least one device (2) spaced from the projection surface, wherein the at least one device (2) is permanently integrated into at least one structure of the motor vehicle (1) for projecting via back projection a virtual parking disc comprising a parking duration and/or a parking start of the motor vehicle (1) onto the projection surface, wherein a projection direction and an intensity of a projection light of the parking duration and/or the parking start are varied,
wherein the at least one device (2) is formed by at least one electrical lighting unit of the motor vehicle (1) which is arranged internal with respect to the projection surface, and is configured for an alphanumerical display of the parking duration and/or the parking start, the at least one electrical lighting unit being a part of the front light or the rear light of the motor vehicle (1) and having one or more organic light-emitting diodes, and
wherein the motor vehicle (1) is configured to determine the parking start based at least in part on a first signal indicating that the motor vehicle (1) is not in drive, a second signal indicating that one or more doors of the motor vehicle (1) are closed, and a third signal indicating that the one or more doors are locked;

wherein the motor vehicle (1) is further configured to determine a parking duration based on a "drive off" signal transmitted by a drive control unit of the motor vehicle; and at least one electronic evaluation system (8) which is configured to receive position data relating to a current position of the motor vehicle (1) to determine, taking account of the position data, whether the motor vehicle (1) is parked in an area in which the display of the parking duration and/or the parking start is/are required, to determine a cost-free parking time and a maximum permitted parking duration if the motor vehicle (1) is parked in an area in which the display of the parking duration and/or the parking start is/are required, and to indicate the cost-free parking time and the maximum permitted parking duration via a display arranged in a passenger compartment of the motor vehicle (1).

2. The motor vehicle (1) according to claim 1, wherein the at least one device (2) is formed at least partially by at least one electrical display device (3) of the motor vehicle (1) which is arranged in an interior (4) of the motor vehicle (1).

3. The motor vehicle (1) according to claim 1, wherein the at least one electronic evaluation system (8) is further configured to display the parking duration and/or the parking start at the instigation of a user via a man-machine interface of the motor vehicle (1) if the motor vehicle (1) is parked in an area in which the display of the parking duration and/or the parking start is/are required.

4. The motor vehicle (1) according to claim 1, wherein the at least one electronic evaluation system (8) is further configured for wireless communication with an automatic parking charge billing system, and wherein the at least one electronic evaluation system (8) is further configured to initiate parking charge billing at the instigation of the user via a man-machine interface of the motor vehicle (1).

5. A method for displaying a parking duration and/or a parking start of a motor vehicle (1), comprising:

determining, by the motor vehicle (1), the parking start based at least in part on a first signal indicating that the motor vehicle (1) is not in drive, a second signal indicating that one or more doors of the motor vehicle (1) are closed, and a third signal indicating that the one or more doors are locked;

determining, by the motor vehicle (1), the parking duration based on a "drive off" signal transmitted by a drive control unit of the motor vehicle (1);

providing the vehicle (1) with a front light or a rear light, a projection surface arranged on the front light or the rear light, and at least one device (2) spaced from the projection surface;

projecting via back projection a virtual parking disc comprising the parking duration and/or the parking start onto the projection surface by the at least one device (2), wherein the at least one device is permanently integrated into at least one structure of the motor vehicle (1), wherein a projection direction and an intensity of a projection light of the parking duration and/or the parking start are varied;

wherein the at least one device (2) is formed by at least one electrical lighting unit of the motor vehicle (1) which is arranged internal with respect to the projection surface, and is configured for an alphanumerical display of the parking duration and/or the parking start, the at least one electrical lighting unit being a part of the front light or the rear light of the motor vehicle (1) and having one or more organic light-emitting diodes;

receiving, by at least one electronic evaluation system (8), position data relating to a current position of the motor vehicle (1);

determining, by the at least one electronic evaluation system (8) and taking account of the position data, whether the motor vehicle (1) is parked in an area in which the display of the parking duration and/or the parking start is/are required;

determining, by the at least one electronic evaluation system (8), a cost-free parking time and a maximum permitted parking duration if the motor vehicle (1) is parked in an area in which the display of the parking duration and/or the parking start is/are required; and indicating, via a display arranged in a passenger compartment of the motor vehicle (1), the cost-free parking time and the maximum permitted parking duration.

* * * * *